United States Patent [19]
Abraham et al.

[11] Patent Number: 5,301,231
[45] Date of Patent: Apr. 5, 1994

[54] USER DEFINED FUNCTION FACILITY

[75] Inventors: Dennis G. Abraham, Concord, N.C.; Daniela Henningsmeyer, Stuttgart, Fed. Rep. of Germany; John M. Hudson, Manassas, Va.; Donald B. Johnson, Manassas, Va.; An V. Le, Manassas, Va.; Stephen M. Matyas, Manassas, Va.; James V. Stevens, Huntersville, N.C.

[73] Assignee: International Business Machines Corporation, Armonk, N.Y.

[21] Appl. No.: 834,634

[22] Filed: Feb. 12, 1992

[51] Int. Cl.⁵ .............................................. H04L 9/00
[52] U.S. Cl. .................................... 380/4; 380/3; 380/23; 380/24; 380/25; 380/49; 380/50; 235/379; 235/380
[58] Field of Search ............... 380/3, 4, 22, 23–25, 380/49, 50, 52; 235/379, 380

[56] References Cited

U.S. PATENT DOCUMENTS

| | | | |
|---|---|---|---|
| 4,219,151 | 8/1980 | Haruki | 235/379 |
| 4,249,180 | 3/1981 | Eberle et al. | 380/37 |
| 4,262,329 | 4/1981 | Bright et al. | 380/4 |
| 4,523,271 | 6/1985 | Levien | 395/575 |
| 4,621,321 | 11/1986 | Boebert et al. | 395/600 |
| 4,698,750 | 10/1987 | Wilkie et al. | 395/425 |
| 4,713,753 | 12/1987 | Boebert et al. | 395/425 |
| 4,747,139 | 5/1988 | Taaffe | 380/44 |
| 4,748,557 | 5/1988 | Tamada et al. | 235/380 X |
| 4,783,801 | 11/1988 | Kaule | 380/3 |
| 4,817,140 | 3/1989 | Chandra et al. | 380/4 |
| 4,847,902 | 7/1989 | Hampson | 380/4 |
| 4,849,927 | 7/1989 | Vos | 235/382.5 |
| 4,864,494 | 9/1989 | Kobus, Jr. et al. | 395/575 |
| 4,906,828 | 3/1990 | Halpern | 235/379 |
| 4,924,514 | 5/1990 | Matyas et al. | 380/24 |
| 4,935,962 | 6/1990 | Austin | 380/25 |
| 4,937,861 | 6/1990 | Cummins | 380/2 |
| 4,951,247 | 8/1990 | Kruse et al. | 235/382 |
| 5,008,936 | 4/1991 | Hamilton et al. | 380/50 |
| 5,014,191 | 5/1991 | Padgaonkar et al. | 395/425 |
| 5,027,397 | 6/1991 | Double et al. | 380/4 |

FOREIGN PATENT DOCUMENTS

| | | |
|---|---|---|
| 0297347A2 | 1/1989 | European Pat. Off. . |
| 0354774A3 | 2/1990 | European Pat. Off. . |

OTHER PUBLICATIONS

"Cryptographic Microcode Loading Controller For Secure Function," *IBM Technical Disclosure Bulletin*, vol. 34, No. 4B, Sep. 1991, pp. 34–36.

IBM Technical Disclosure Bulletin TDB Aug. 8, 1987 pp. 1284–1285, vol. 30, No. 3.

IBM Technical Disclosure Bulletin TDB May 1986, pp. 5168–5169; vol. 28, No. 12.

*Primary Examiner*—Bernarr E. Gregory
*Attorney, Agent, or Firm*—Calfee, Halter & Griswold

[57] ABSTRACT

In a cryptographic module, a User Defined Function (UDF) facility is provided which provides users with the capability of defining and creating custom functions to meet their cryptographic processing needs. The cryptographic module is contained within a physically and logically secure environment and comprises a processing unit and memory connected to the processing unit. The memory includes code for translating User Defined Functions (UDFs) into a machine-readable form and at least one command for operating on the UDFs. The UDFs are loaded into and executed in the secure area of the cryptographic module without compromising the total security of the transaction security system.

43 Claims, 6 Drawing Sheets

USER DEFINED FUNCTION FACILITY

FIELD OF THE INVENTION

This invention relates to a User Defined Function (UDF) facility which provides users with the capability of defining and creating custom functions to meet their unique cryptographic processing needs. These User Defined Functions (UDFs) are loaded into and executed in the secure area of a cryptographic module without compromising the total security of a transaction security system.

BACKGROUND OF THE INVENTION

In the finance and transaction processing industry, there is often a need to protect data contained within a computer system and transmitted over a computer network. Over the years, a number of mechanisms have been developed to meet this need.

One of the mechanisms that has been developed to protect data being transmitted over a computer network is the cryptographic processor. A cryptographic processor accomplishes this by transforming the data to be protected into an unrecognizable form using a cryptographic scheme and a key. Even with knowledge of the cryptographic scheme, the recognizable form of the data is inaccessible while the data is being transmitted over the computer network so long as the key is kept secret. Cryptographic processors can be created to implement a variety of cryptographic schemes for the encryption and decryption of data.

However, since it is necessary for the keys used by a cryptographic processor to be stored and transmitted within the computer system, additional protection is required to prevent unauthorized access to and copying of the keys. A mechanism that has been developed to further protect data from copying is electrical circuitry such as that described in U.S. Pat. No. 4,523,271 to Levien. The electrical circuitry disclosed in Levien enables access to data in a protected memory only if the access is in response to an instruction that was previously fetched from the same memory or if the microprocessor is in an input/output cycle. Thus, the circuitry prevents unauthorized access to data within the protected memory.

While these types of mechanisms protect data from electronic attacks, they are insufficient to protect data from physical attacks. Some well known forms of physical attack are mechanical or chemical intrusion, temperature modification, and radiation exposure. One mechanism that has been developed to protect data against physical attack is an intrusion barrier such as that described in U.S. Pat. No. 5,027,397 to Double, of common assignee with this application. The intrusion barrier disclosed in Double includes a screen material surrounding the electronic assembly which screen material has formed thereon fine conductive lines and an electrical supply and signal detection means to detect a change in the resistance of the conductive lines. The intrusion barrier disclosed in Double further includes temperature sensing means and radiation detection means to detect a predetermined decrease in the temperature or increase in the radiation, respectively.

Using a cryptographic processor in conjunction with the electrical and physical protection devices of Levien and Double, a secure cryptographic module can be created. However, a major drawback of such a cryptographic module is its lack of flexibility. The erasable programmable read only memory (EPROM) used in the cryptographic module is programmed with a set of defined cryptographic functions. The particular cryptographic functions that are programmed into the EPROM are selected by determining what functions would be desirable to most users of the cryptographic module. However, there may be additional cryptographic functions which a particular user would like to have added to a cryptographic module. These additional functions may be unknown at the time the EPROM is programmed, they may be user specific and only required by a few users, or they may involve proprietary steps or processes that the user does not want disclosed. In any event, it is not commercially feasible to add all of these additional functions to the functions that are programmed into the EPROM. Using present cryptographic modules, the EPROM would have to be removed from the module, erased, and then reprogrammed to include the additional functions. These additional steps can be costly and time consuming, and maybe even impossible, because the physical protection is specifically designed to inhibit such activity.

SUMMARY OF THE INVENTION

The present invention eliminates the need that exists in present cryptographic modules to remove, erase, and reprogram the EPROM whenever it is desired to add an additional cryptographic function to the defined cryptographic functions that are programmed into the EPROM.

Generally, the present invention provides users with the capability of defining and creating custom functions, in addition to the functions already programmed into the EPROM, to meet their unique cryptographic processing needs. These User Defined Functions (UDFs) can be loaded into and executed in the secure area of the cryptographic module without compromising the total security of the transaction security system.

In accordance with the preferred embodiment of the present invention, the User Defined Function (UDF) facility includes a UDF machine, a set of UDF instructions, and a set of UDF commands. The UDFs are created using the set of UDF instructions. The UDF programmer selects particular instructions from the set of UDF instructions and arranges them in a sequence appropriate to implement the desired function of the UDF. The UDF input file that is created is then assembled using a macroassembler. Next, a UDF Set is created by specifying the UDFs to be included in the UDF Set using the appropriate UDF instructions. The UDF Set definition file that is created is then assembled and linked together with the previously assembled UDFs into a single UDF Set. The executable UDF Set may be used as input to a UDF simulator to verify the operation of the individual UDFs. The UDFs are then managed using the set of UDF commands. The set of UDF commands enables the user to register, load, verify, delete, invoke, and query the UDFs contained in the UDF Set. Even though the UDFs are loaded into and executed in the secure area of the cryptographic module, the total security of the transaction security system is not compromised.

Compromise is avoided by allowing the UDF programmer to use only the pre-defined UDF instructions and by limiting the data areas that are accessible to the UDF instructions. Thus, the UDF programmer is not able to access any of the data areas outside the UDF machine in the secure area of the cryptographic module. It is also possible to discriminate between cryptographic keys that may be used by a UDF and cryptographic keys that are excluded from use in a UDF.

Other features and advantages of the present invention will become apparent from the following detailed description and accompanying drawings which form a part of the specification.

DETAILED DESCRIPTION OF THE PREFERRED EMBODIMENT

Figure 1:
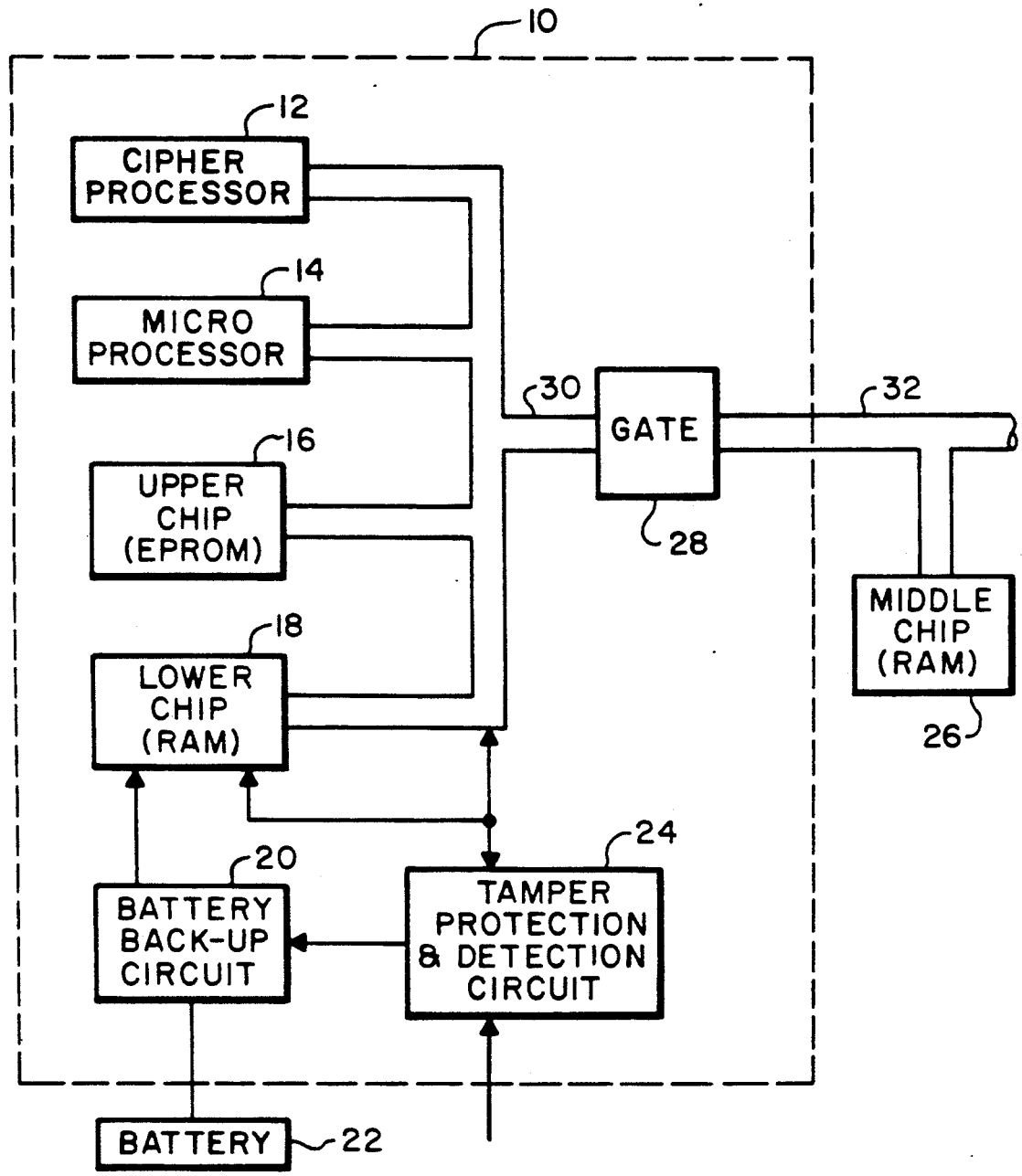
FIG. 1 is a schematic drawing of a prior art cryptographic module.
Figure 2:
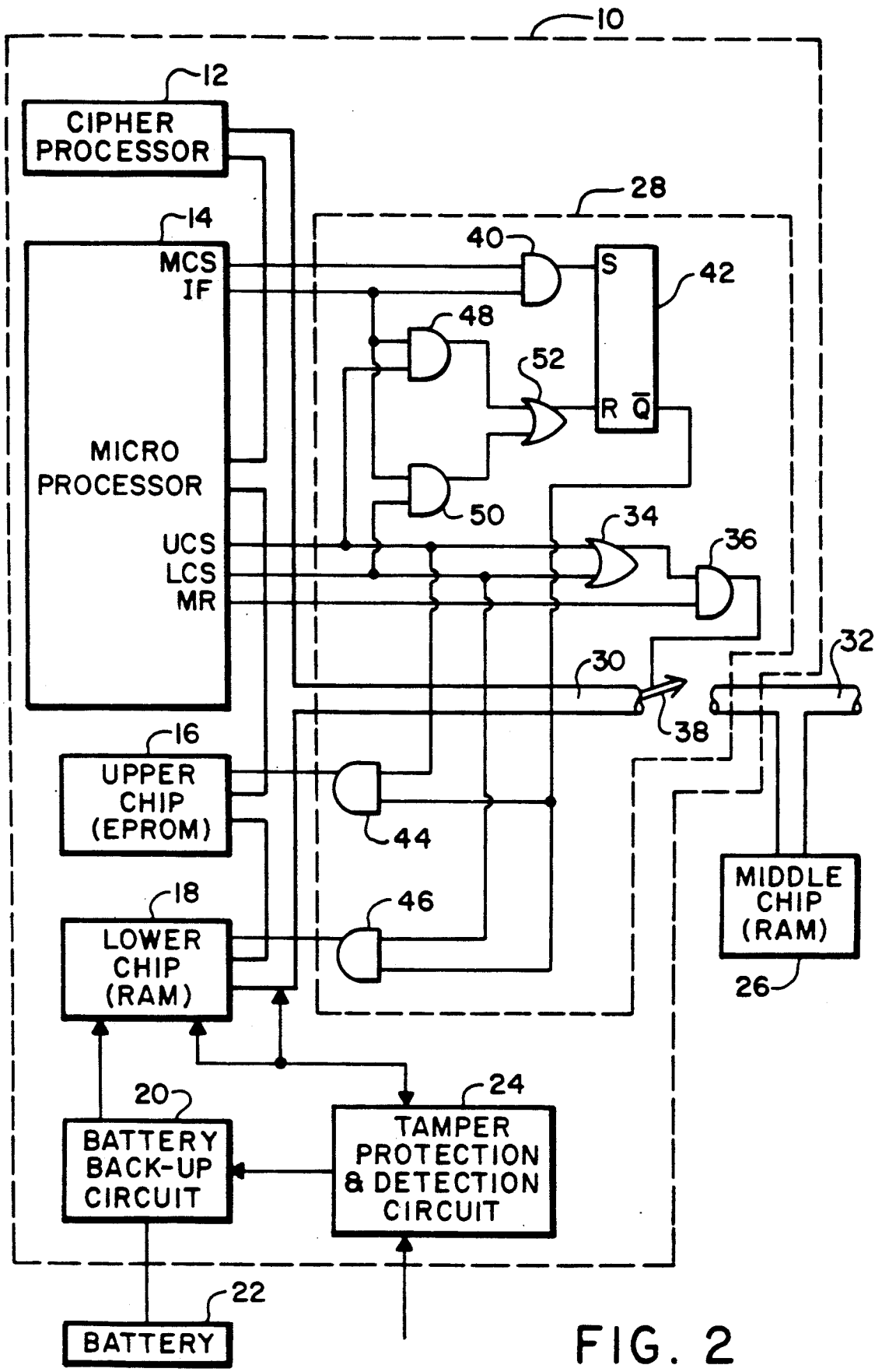
FIG. 2 is a schematic drawing of the circuitry of a gate in a cryptographic module.

Referring now to the drawings and for the present to FIG. 1, a typical prior art cryptographic module 10 is shown. The cryptographic module 10 provides a secure environment for a cipher processor 12, a microprocessor 14, erasable programmable read only memory (EPROM) or upper chip 16, and random access memory (RAM) or lower chip 18. The cryptographic module 10 is controlled by the microprocessor 14, using the secure memories 16 and 18. Cryptographic keys, which are used for the encryption and decryption of data, are stored in the lower chip 18 which is kept active by a battery backup circuit 20 and a battery 22. In order to protect against a physical attack on the cryptographic module 10, the battery backup circuit 20 operates under the control of a tamper protection and detection circuit 24 which is designed to detect attempts to penetrate the cryptographic module 10 by physical attack. The physical protection of the cryptographic module 10 is described in greater detail in said U.S. Pat. No. 5,027,397, incorporated herein by reference and having the same assignee as this application. (However, other physical protection devices can be used.) The microprocessor 14 uses random access memory (RAM) or middle chip 26 which is located outside of the cryptographic module 10, in addition to the secure memories 16 and 18. To prevent access to the contents of the secure memories 16 and 18 while the microprocessor 14 or the cipher processor 12 is performing a secure process, a gate 28 opens the connection of an inner portion of a bus 30 to an outer portion of a bus 32 so that any information on the inner portion of the bus 30 cannot be read from outside of the cryptographic module 10 at contacts connected to the outer portion of the bus 32. The operation of gate 28 is shown in greater detail in FIG. 2.

Gate 28 includes electrical circuitry designed to prevent access to the inner portion of the bus 30 while the microprocessor 14 is performing a read from the upper chip 16 or the lower chip 18. The electrical circuitry is further designed to prevent access to the upper chip 16 or the lower chip 18 while the microprocessor 14 is executing an instruction which was fetched from the middle chip 26.

The microprocessor 14 generates status signals, including MCS, IF, UCS, LCS, and MR. These status signals are generated if there is a middle chip select, an instruction fetch, an upper chip select, a lower chip select, or a memory read, respectively. The electrical circuitry of gate 28 monitors these status signals.

The UCS and LCS status signals are applied to an OR gate 34. The output from OR gate 34 is then applied along with the MR status signal to an AND gate 36. If the upper chip 16 or the lower chip 18 is selected and a memory read is being performed, the output from AND gate 36 will be active and a switch 38 will be opened preventing access to the inner portion of the bus 30.

The MCS status signal and the IF status signal are applied to an AND gate 40. The output from AND gate 40 is then applied to input S of an R-S flip flop 42. If the middle chip 26 is selected and an instruction fetch is being performed, the flip flop 42 is set. The output Q of flip flop 42 is applied to an AND gate 44 along with the UCS status signal and to an AND gate 46 along with the LCS status signal. If the flip flop 42 has been set, access to the upper chip 16 or the lower chip 18 is blocked.

The UCS status signal and the IF status signal are applied to an AND gate 48 and the LCS status signal and the IF status signal are applied to an AND gate 50. The output of AND gate 48 and the output of AND gate 50 are then applied to an OR gate 52. If the upper chip 16 or the lower chip 18 is selected and an instruction fetch is being performed, the flip flop 42 is reset. When the flip flop 42 has been reset, access to the upper chip 16 or the lower chip 18 is permitted.

Figure 3:
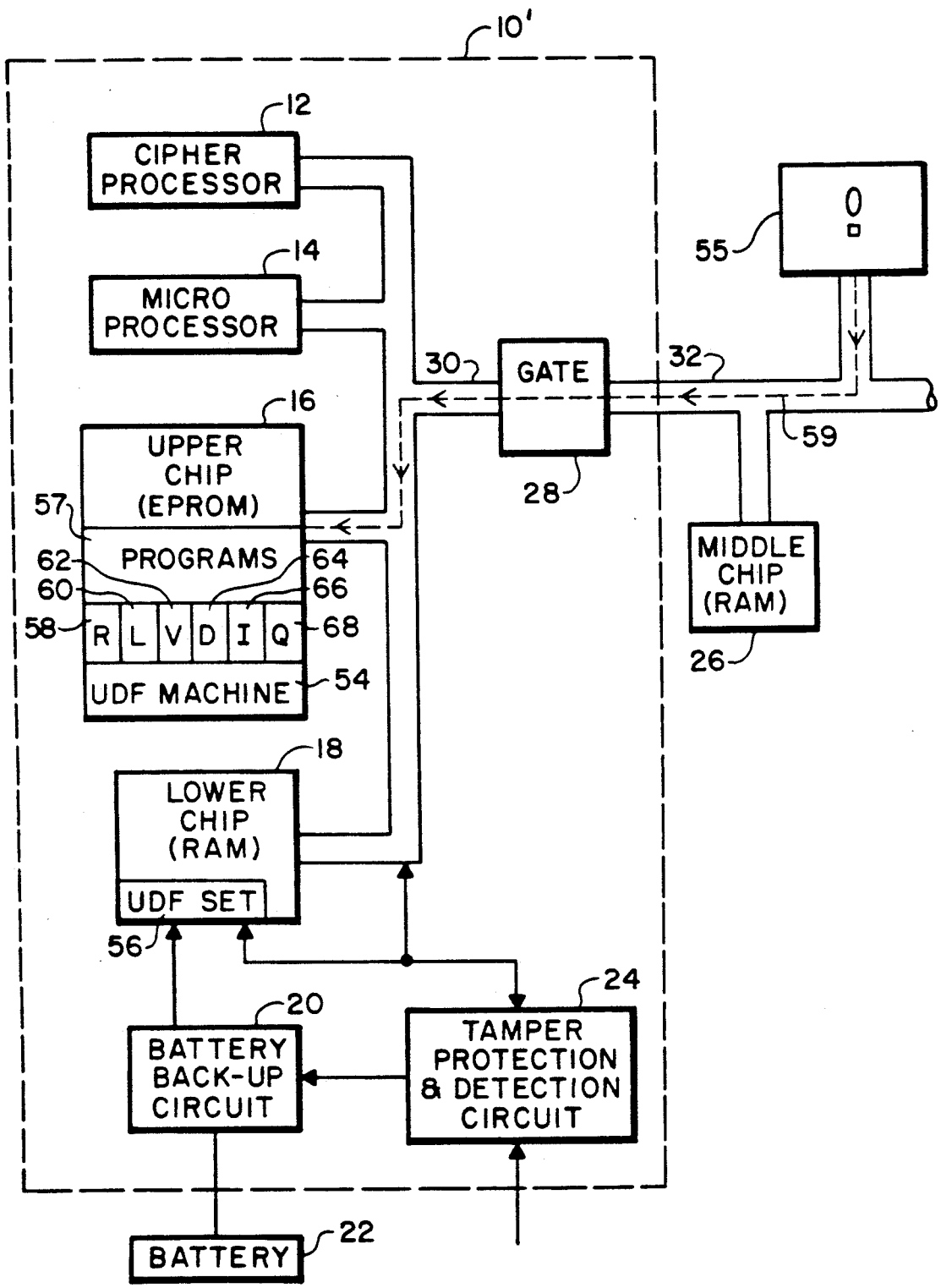
FIG. 3 is a schematic drawing of a cryptographic module with the addition of a UDF facility constructed according to the principles of the present invention.

FIG. 3 shows a preferred embodiment of a cryptographic module 10' constructed according to the principles of the present invention. The cryptographic module 10' comprises the elements of the cryptographic module 10 with the addition of a User Defined Function (UDF) facility. The UDF facility includes a UDF machine 54, a set of UDF instructions which are used to create a UDF Set 56, and a set of UDF commands 58, 60, 62, 64, 66, and 68.

In the preferred embodiment, the code which implements the UDF machine 54 and the set of UDF commands 58, 60, 62, 64, 66, and 68 is loaded into the upper chip 16 from media, such as a diskette, or another memory during manufacture of the cryptographic module 10'. It will be understood that if the cryptographic module 10' is designed with an upper chip 16 that is programmable after manufacture, the code which implements the UDF machine 54 and the set of UDF commands 58, 60, 62, 64, 66, and 68 will be loadable from a media 55 by other programs 57, which are already in the upper chip 16, along path 59 at a later time.

Figure 5:
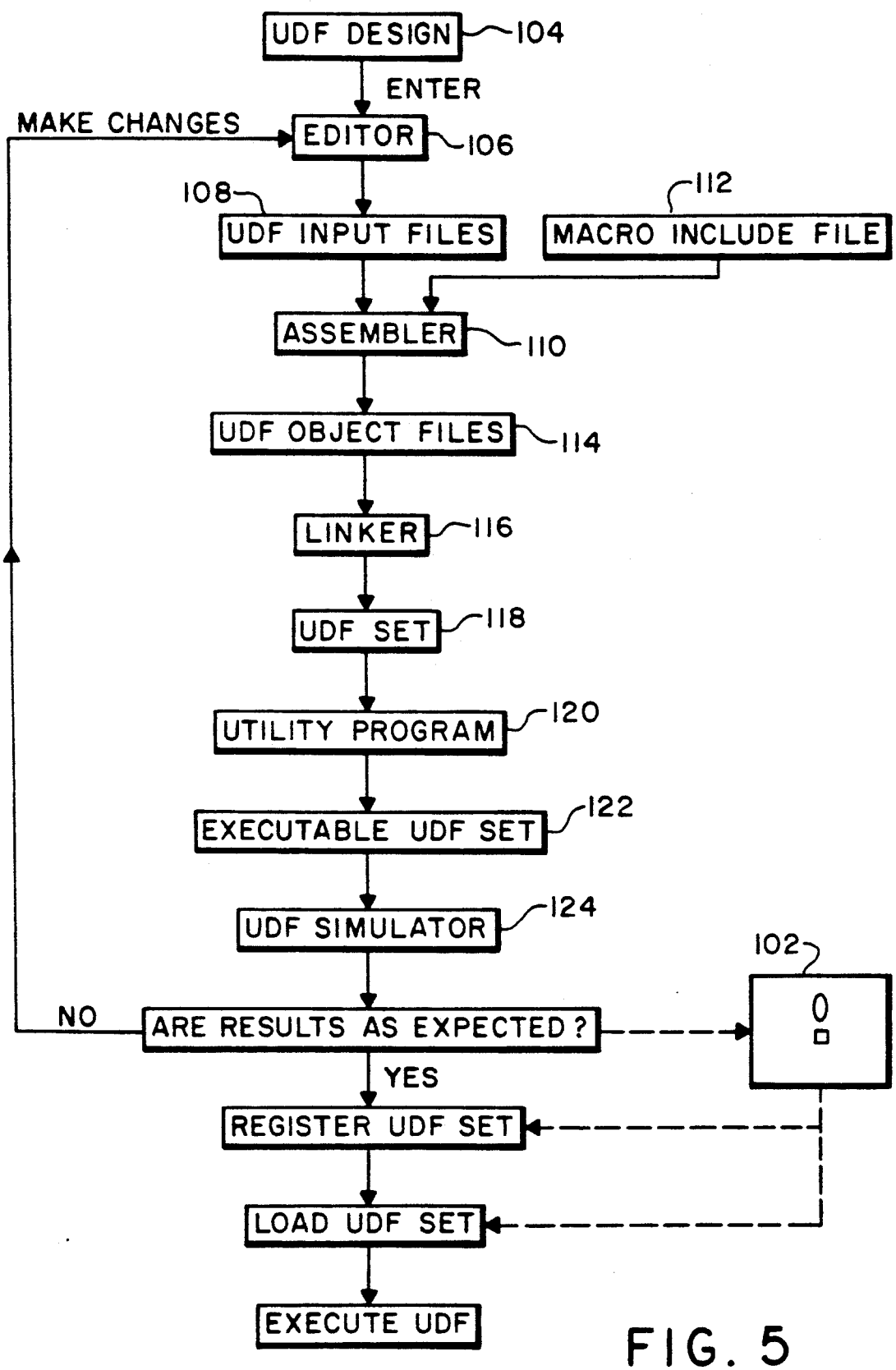
FIG. 5 is a flow chart illustrating the UDF development process.

The upper chip 16 in the cryptographic module 10' is programmed with a set of defined cryptographic functions. The UDF facility provides users with the capability of defining and creating custom functions, in addition to the functions already programmed into the upper chip 16, to meet their unique cryptographic processing needs. These User Defined Functions (UDFs) are created using the set of UDF instructions. The UDF programmer selects particular instructions from the set of UDF instructions and arranges them in a sequence appropriate to implement the desired function of the UDF. The UDF input file that is created is then assembled using a macroassembler. Next, a UDF Set is created by specifying the UDFs to be included in the UDF Set using the appropriate UDF instructions. The UDF Set definition file that is created is then assembled and linked together with the previously assembled UDFs into a single UDF Set. The executable UDF Set may be used as input to a UDF simulator to verify the operation of the individual UDFs. The UDFs are then managed using the set of UDF commands 58, 60, 62, 64, 66, and 68. The set of UDF commands 58, 60, 62, 64, 66, and 68 enables the user to register, load, verify, delete, invoke, and query the UDFs, respectively. Even though the UDFs are loaded into the secure area of the cryptographic module 10' from media 102 outside of the cryptographic module 10' (as shown in FIG. 5 and discussed in greater detail below) and executed in the secure area of the cryptographic module 10', the total security of the transaction security system is not compromised.

Compromise is avoided by allowing the UDF programmer to use only the pre-defined UDF instructions to create a UDF. The 'low level' instructions or operations that are understandable by the microprocessor 14 cannot be included in a UDF. Additionally, the data areas that are accessible to the UDF instructions are limited. Thus, the UDF programmer can only access data that is located within the UDF machine 54. The UDF machine 54 prevents the UDF programmer from accessing data that is outside the UDF machine 54. Attempts to access data outside the limits of the UDF machine 54 result in an error signal being generated.

Machine level code can also be loaded into and executed out of middle chip 26 without compromising the total security of the transaction security system. Compromise is avoided in this situation through the use of gate 28 which prevents instructions in middle chip 26 from accessing data in upper chip 16 or lower chip 18. The code in middle chip 26, therefore, can include 'low level' instructions or operations that are understandable by the microprocessor 14. Although the code executes outside the secure area of the cryptographic module 10', four of the UDF commands, 58, 62, 64, and 68 are used to manage the code. Furthermore, cryptographic and system services are provided to the code via a 'Call' interface.

Figure 4:
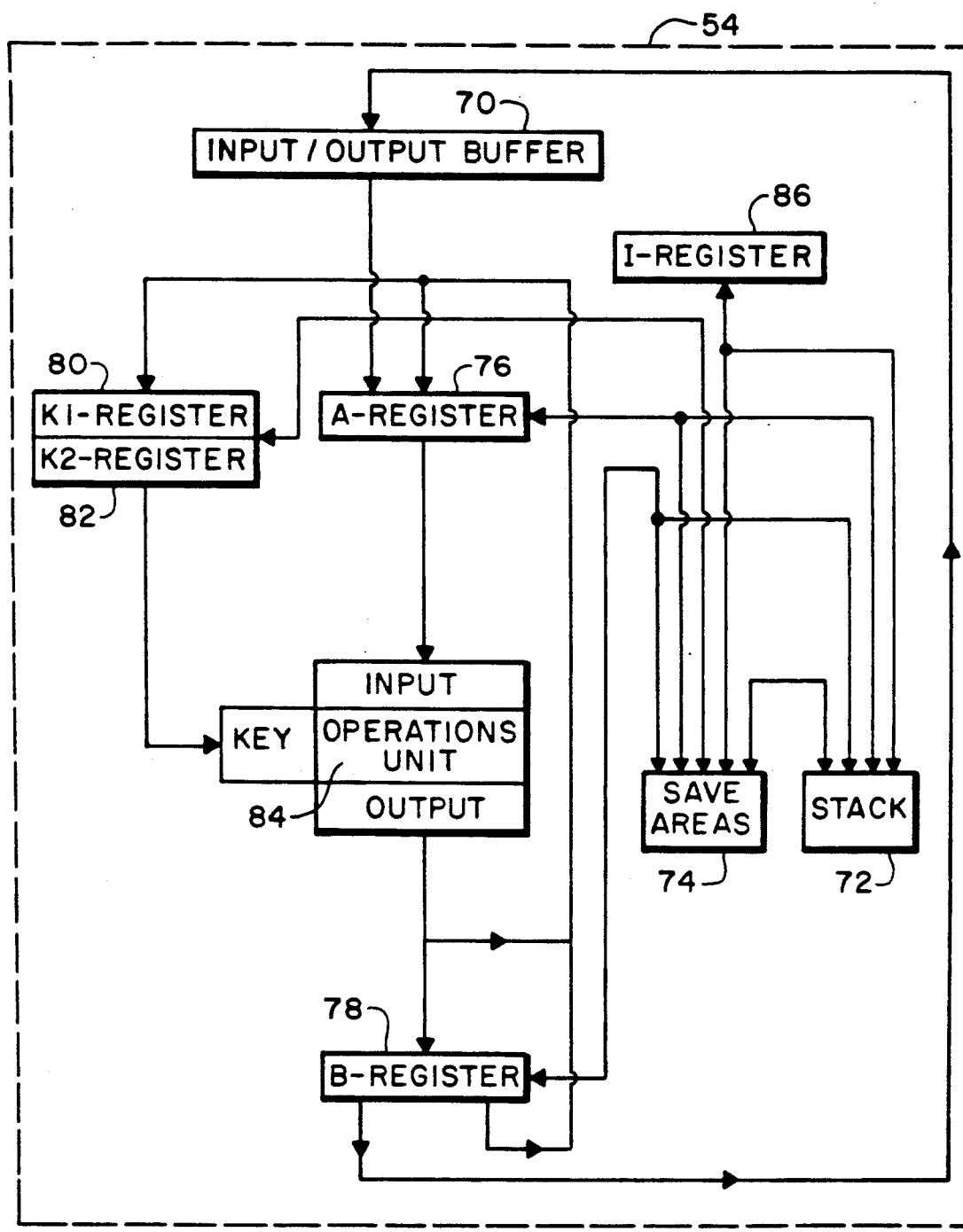
FIG. 4 is a schematic drawing of a UDF machine.

While it is possible to create a UDF that could expose a cleartext key, the master key can in no way be compromised. During the execution of a particular UDF that involves cryptographic operations, the K1-Register 80 and/or the K2-Register 82 (which are shown in FIG. 4 and discussed in greater detail below) will ordinarily contain cleartext cryptographic keys. The keys are loaded into the K1-Register 80 and the K2-Register 82 using the LDKEY1 instruction and the LDKEY2 instruction, respectively. The LDKEYx instructions require the adjacent higher odd numbered save area to contain a Control Vector (CV) that will be exclusive-OR'd with the master key. The result of the exclusive-OR is then used to recover the clear key from the quantity contained in the specified even numbered save area. Control vectors are discussed in greater detail in U.S. Pat. Nos. 4,993,069, 5,007,089, 5,073,934, 4,850,017, 4,941,176, 4,918,728, 4,924,514, and 4,924,515, all of common assignee with this application. One bit of the CV controls usage of the key in the UDF facility. Another bit of the CV controls usage of the key in operations performed by code that is loaded into middle chip 26. A third bit of the CV controls usage of the key in normal (non-UDF) operations.

If the first bit is active, the key is permitted to be used in the UDF facility. If the first bit is not active, usage of the key in the UDF facility is blocked. If the second bit is active, the key is permitted to be used in operations performed by code that is loaded into middle chip 26. If the second bit is not active, usage of the key in operations performed by code that is loaded into middle chip 26 is blocked. If the third bit is active, the key is permitted to be used in normal (non-UDF) operations. If the third bit is not active, usage of the key in normal (non-UDF) operations is blocked. The use of these three bits makes it possible to discriminate among keys for use in the various combinations of operations. For example, a key can be created that can only be used in the UDF machine. Thus, the key cannot be used in the normal (non-UDF) operations and compromise of data outside the UDF machine is avoided.

The keys that are controlled by the description above are keys that are encrypted under the master key. In the recovery of a key, the user has a clear copy of the key. Therefore, the UDF code must be carefully written to ensure that no keys are exposed.

In one alternate embodiment, the keys are maintained in an encrypted form and the encrypted form is passed to all utilizing UDF instructions. This supports chained operations where a first key is decrypted under the master key and then is used directly to decrypt a second key without exposing the first key in clear form. This enables the second key to be used in the UDF only if the CVs for the first key and the second key permit those keys to be used in a UDF (i.e. the first bit is active in both CVs). This embodiment requires the deletion of the UDF instruction that allows keys to be recovered in clear form, or it requires another bit in the CV to distinguish which keys can be recovered and which keys cannot be recovered using the LDKEYx instructions. Those keys which cannot be recovered using the LDKEYx instructions can only be used via a chained recovery mechanism.

In another alternate embodiment, a bit in the CV indicates whether the key is to be returned to the invoking UDF or stored in a protected area similar to the master key. If the key is to be stored in a protected area, the recovered key will be used in subsequent cryptographic operations on the basis of an address or pointer to the key, but the value of the key will not be available to the invoking UDF.

UDF Machine

The UDF machine 54 is illustrated in greater detail in FIG. 4. The drawing is a representation of the function of the UDF machine which is implemented by code stored in the upper chip 16. The UDF machine 54 includes an input/output (I/O) buffer 70, a push/pop stack 72, save areas 74, data registers 76 and 78, key registers 80 and 82, an operations unit 84, and a count register 86. The actual storage areas associated with the I/O buffer 70, the stack 72, the save areas 74, the data registers 76 and 78, the key registers 80 and 82, the operations unit 84, and the count register 86 are in the lower chip 18.

The I/O buffer 70 is used to pass all data and results between the invoking application and the UDF. Input from the invoking application is made available to the UDF by moving it from the I/O buffer 70 into the A-Register 76 via one of two instructions, Load A-Register (LAR) or Load A-Register Indirect (LARI). Results from the UDF are made available to the invoking application by moving them from the B-Register 78 into the I/O buffer 70 via one of two instructions, Store B-Register (SBR) or Store B-Register Indirect (SBRI). The encryption and decryption instructions, ENCIP and DECIP, get input directly from and store results directly to the I/O buffer 70. The I/O buffer 70 is unique to the UDF machine and can be managed in any known manner desired by the UDF programmer. In addition, the I/O buffer 70 is battery backed up (not shown). Thus, non-volatile data, such as unique keys for UDF use, can be stored there. The loading and destruction of such keys can be done using a UDF designed for such a purpose. The I/O buffer 70 is 4095 bytes long in the preferred embodiment.

The push/pop stack 72 is implemented at the highest I/O buffer address. The size of the stack 72 is specified when the UDF Set header is defined at assembly time. Three stack sizes may be specified: small—512 bytes, medium—1024 bytes, and large—2048 bytes. The first 512 bytes of the stack 72 are 'free'—the space is not subtracted from the I/O buffer space. For medium or large stack sizes, the additional space is taken from the I/O buffer space starting at the highest I/O buffer address. The A-Register 76, B-Register 78, and I-Register 86 as well as the save areas 74 may be pushed onto and popped off the stack 72. The stack 72 is initialized when the UDF Set is loaded and a CLRSTK instruction is provided to reset the Top Of Stack (TOS) pointer to the highest stack address.

The two data registers, the A-Register 76 and the B-Register 78, are used for the manipulation of data. Both data registers 76 and 78 are eight bytes wide in the preferred embodiment. In general, the A-Register 76 receives the input to the operations unit 84 and the B-Register 78 receives the output from the operations unit 84.

The two key registers, the K1-Register 80 and the K2-Register 82, are used to hold cryptographic keys for the cipher type instructions. Both key registers 80 and 82 are eight bytes wide in the preferred embodiment. The LDKEY1 and LDKEY2 instructions are used to load cryptographic keys into the K1-Register 80 and the K2-Register 82, respectively.

There are sixteen save areas 74 available. Each of the save areas 74 is eight bytes wide in the preferred embodiment. The contents of the A-Register 76, the B-Register 78, the K1-Register 80, the K2-Register 82, and the I-Register 86 can be saved to the save areas 74 via SAVEA, SAVEB, SAVEK1, SAVEK2, and SAVEI instructions, respectively. The contents of the save areas 74 can be restored to the A-Register 76, the B-Register 78, the K1-Register 80, the K2-Register 82, and the I-Register 86 via RESTA, RESTB, RESTK1, RESTK2, and RESTI instructions, respectively. Thus, data may be transferred between the various registers and the save areas using the SAVEx and RESTx instructions. Some UDF instructions use an even/odd pair of save areas 74 to hold arguments. In general, the save areas 74 are used to hold intermediate results in much the same way a stack might be used. The contents of the save areas 74 are not cleared upon entering a UDF nor are they cleared upon exiting a UDF.

There is no 'real' entity corresponding to the operations unit 84, but the term is used to help visualize the architecture of the UDF machine 54. All of the instructions, i.e. ANDD, ORR, XORR, are assumed to take place in the operations unit 84.

The count register, the I-Register 86, is used generally as a loop counter. The I-Register 86 is two bytes wide in the preferred embodiment.

The data in the data paths and registers is treated as eight unsigned characters (bytes). High order byte (byte 0) is on the left and low order byte (byte 7) is on the right. A carry, borrow, or shift is propagated byte to byte from right to left, but not out of the eight bytes. Within each byte, high order bit (bit 0) is on the left and low order bit (bit 7) is on the right.

UDF Instructions

The set of UDF instructions includes 97 instructions available for use in creating a UDF. It is contemplated, however, that additional UDF instructions may be implemented. The mnemonic form of each of these instructions is given below along with a description of its function in the preferred embodiment.

1. ADDD—Add the contents of the A-Register 76 to the contents of the B-Register 78 and store the result in the B-Register 78. There are no facilities for detecting an overflow condition or the occurrence of a carry value from the high order byte.

2. ANDD—AND the contents of the A-Register 76 to the contents of the B-Register 78 and store the result in the B-Register 78.

3. AREG2STK—Move the contents of the A-Register 76 to the stack 72 at the offset specified in the instruction. The A-Register 76 and the TOS pointer are not changed. The specified offset is added to the 'origin of the stack'—the lowest address in stack storage. The low order three bits of the specified offset are set to X'000' to force the offset to be a multiple of eight bytes. The specified offset is relative to the origin of the stack 72, not the top of the stack 72. The origin of the stack 72 depends on the size of the stack 72. For a small stack 72, the origin of the stack 72 is at offset X'1000' from the start of the I/O buffer 70 and the instruction AREG2STK 8 would result in the A-Register 76 being stored at X'1008' from the start of the I/O buffer 70. If the stack 72 is medium, the same instruction stores the A-Register 76 at X'E08' from the start of the I/O buffer 70 and if the stack 72 is large, it stores the A-Register 76 at X'808' from the start of the I/O buffer 70. It is the UDF programmer's responsibility to keep track of where data is moved to and from the stack 72.

4. CLRA—Clear the A-Register 76 to all zeroes.

5. CLRB—Clear the B-Register 78 to all zeroes.

6. CLRK1 value—Clear the eight bytes of the K1-Register 80 to the value specified in the instruction. Both nibbles of each byte of the K1-Register 80 will be set to the specified value.

7. CLRK2 value—Clear the eight bytes of the K2-Register 82 to the value specified in the instruction. Both nibbles of each byte of the K2-Register 82 will be set to the specified value.

8. CLRSTK—Reset the TOS pointer to the highest stack address. The data contained in the stack 72 is cleared to all zeroes.

9. DECB—Subtract one from the contents of the B-Register 78 and store the result in the B-Register 78. There are no facilities for detecting an underflow condition or the occurrence of a borrow value from the high order byte. If the B-Register 78 contains all zeroes at the start of the instruction, it will contain all F's at the completion of the instruction.

10. DECI—Subtract one from the contents of the I-Register 86 and store the result in the I-Register 86. There are no facilities for detecting an underflow condition or the occurrence of a borrow value from the high order byte. If the I-Register 86 contains all zeroes at the start of the instruction, it will contain all F's at the completion of the instruction.

11. DECIP Key, SA—Perform a Data Encryption Algorithm Cipher Block Chaining (DEA CBC) mode decryption operation using the key register (K1-Register 80 or K2-Register 82) specified in the instruction. 'SA' specifies an even numbered save area 74. Permissible values of 'SA' are 0, 2, 4, and 6 in the preferred embodiment. The rightmost two bytes of the specified even numbered save area 74 contain a displacement (0DDD) into the I/O buffer 70 to byte 0 of the input ciphertext to be deciphered. The rightmost two bytes of the adjacent higher odd numbered save area 74 contain a displacement (0ddd) into the I/O buffer 70 where byte 0 of the resultant cleartext is to be stored. The number of eight byte blocks to be deciphered is contained in the I-Register 86. The B-Register 78 is assumed to contain the Initial Chaining Vector (ICV) at the start of the instruction. Load the A-Register 76 with the eight bytes of data starting at I/O buffer+0DDD, using 0DDD from the even numbered save area 74. Increment the contents of the even numbered save area 74 by eight so that it points to the next eight bytes of data. Decipher the contents of the A-Register 76 and XOR the result into the B-Register 78. Store the resultant cleartext in the B-Register 78 at I/O buffer+0ddd, using 0ddd from the odd numbered save area 74. Increment the contents of the odd numbered save area 74 by eight. Decrement the contents of the I-Register and repeat the process using the previous input instead of the ICV to recover the cleartext until the I-Register 86 is equal to zero.

12. DECODE Key, In, Out—Perform a Data Encryption Algorithm Electronic Code Book (DEA ECB) mode decryption operation using the registers specified in the instruction. 'Key' must be the K1-Register 80 or the K2-Register 82. 'In' may be either the A-Register 76 or the B-Register 78 and 'Out' may be either the A-Register 76 or the B-Register 78. The same register may be specified for both 'In' and 'Out.' Additionally, the instruction could be expanded by known methods to allow 'Key' to be the A-Register 76 or the B-Register 78.

13. DECSA SA—Subtract one from the contents of the save area 74 specified in the instruction and store the result in the specified save area 74. There are no facilities for detecting an underflow condition or the occurrence of a borrow value from the high order byte. If the specified save area 74 contains all zeroes at the start of the instruction, it will contain all F's at the completion of the instruction.

14. DEC2HEX, SAi, SAj—Convert the contents of the first save area 74 specified in the instruction into a hexadecimal value and store the result int he second save area 74 specified in the instruction. The first specified save area 74 is assumed to contain a binary coded decimal value. The second specified save area 74 is cleared to all zeroes at the start of the instruction. The same save area 74 may be specified for both operands.

15. DEFCON SA, value—Right justify the value specified in the instruction into the save area 74 specified in the instruction. The specified value is assumed to be a hexadecimal value. The specified save area 74 is cleared to all zeroes at the start of the instruction.

16. DIVISA SAi, SAj—Divide the rightmost four bytes of the first save area 74 specified in the instruction into the eight bytes of the second save area 74 specified in the instruction. Store the resulting four byte quotient in the B-Register 78. Store the resulting remainder in the leftmost four bytes of the first specified save area 74. The B-Register 78 is cleared to all zeroes at the start of the instruction. Unsigned integer arithmetic is used and any overflow is lost. The same save area 74 may be specified for both operands.

17. EMKK1 SA—Encipher the key from the K1-Register 80 into the save area 74 specified in the instruction. 'SA' specifies an even numbered save area 74. Permissible values of 'SA' are 8, 10, 12, and 14 in the preferred embodiment. The specified even numbered save area 74 receives the quantity e*KM.CV1(K1). This quantity is the triple encipherment (ede) of K1 under the control vector variant (CV1) of key KM. The adjacent higher odd numbered save area 74 contains the quantity CV1. Successful completion of the instruction results in the enciphered key being stored in the specified even numbered save area 74.

18. EMKK2 SA—Encipher the key from the K2-Register 82 into the save area 74 specified in the instruction. 'SA' specifies an even numbered save area 74. Permissible values of 'SA' are 8, 10, 12, and 14 in the preferred embodiment. The specified even numbered save area 74 receives the quantity e*KM.CV1(K2). This quantity is the triple encipherment (ede) of K2 under the control vector variant (CV1) of key KM. The adjacent higher odd numbered save area 74 contains the quantity CV1. Successful completion of the instruction results in the enciphered key being stored in the specified even numbered save area 74.

19. ENCIP Key, SA—Perform a Data Encryption Algorithm Cipher Block Chaining (DEA CBC) mode encryption operation using the key register (K1-Register 80 or K2-Register 82) specified in the instruction. 'SA' specifies an even numbered save area 74. Permissible values of 'SA' are 0, 2, 4, and 6 in the preferred embodiment. The rightmost two bytes of the specified even numbered save area 74 contain a displacement (0DDD) into the I/O buffer 70 to byte 0 of the input cleartext to be enciphered. The rightmost two bytes of the adjacent higher odd numbered save area 74 contain a displacement (0ddd) into the I/O buffer 70 where byte 0 of the resultant ciphertext is to be stored. The number of eight byte blocks to be enciphered is contained in the I-Register 86. The B-Register 78 is assumed to contain the Initial Chaining Vector (ICV) at the start of the instruction. Load the A-Register 76 with the eight bytes of data starting at I/O buffer +0DDD, using 0DDD from the even numbered save area 74. Increment the contents of the even numbered save area 74 by eight so that it points to the next eight bytes of data. XOR the contents of the B-Register 78 into the A-Register 76 and encipher the contents of the A-Register 76. Store the resultant ciphertext in the B-Register 78 at I/O buffer+0ddd, using 0ddd from the odd numbered save area 74. Increment the contents of the odd numbered save area 74 by eight. Decrement the contents of the I-Register 86 and repeat the process using the previous result instead of the ICV to encipher the cleartext until the I-Register 86 is equal to zero.

20. ENCODE Key, In, Out—Perform a Data Encryption Algorithm Electronic Code Book (DEA ECB) mode encryption operation using the registers specified in the instruction. 'Key' must be the K1-Register 80 or the K2-Register 82. 'In' may be either the A-Register 76 or the B-Register 78 and 'Out' may be either the A-Register 76 or the B-Register 78. The same register may be specified for both 'In' and 'Out.' Additionally, the instruction could be expanded by known methods to allow 'Key' to be the A-Register 76 or the B-Register 78.

21. EXIT—Exit the currently executing UDF.

22. GRNB—Generate a random number and store it in the B-Register 78.

23. GRNK1—Generate a random number and store it in the K1-Register 80.

24. GRNK2—Generate a random number and store it in the K2-Register 82.

25. GRNSA SA—Generate a random number and store it in the save area 74 specified in the instruction.

26. HEX2DEC SAi, SAj—Convert the contents of the first save area 74 specified in the instruction into a binary coded decimal value and store the result in the second save area 74 specified in the instruction. The first specified save area 74 is assumed to contain a hexadecimal value. The second specified save area 74 is cleared to all zeroes at the start of the instruction. Hexadecimal numbers are truncated on the left and lost. The same save area 74 may be specified for both operands.

27. INCB—Add one to the contents of the B-Register 78 and store the result in the B-Register 78. There are no facilities for detecting an overflow condition or the occurrence of a carry value from the high order byte. If the B-Register 78 contains all F's at the start of the instruction, it will contain all zeroes at the completion of the instruction.

28. INCI—Add one to the contents of the I-Register 86 and store the result in the I-Register 86. There are no facilities for detecting an overflow condition or the occurrence of a carry value from the high order byte. If the I-Register 86 contains all F's at the start of the instruction, it will contain all zeroes at the completion of the instruction.

29. INCSA SA—Add one to the contents of the save area 74 specified in the instruction and store the result in the specified save area 74. There are no facilities for detecting an overflow condition or the occurrence of a carry value from the high order byte. If the specified save area 74 contains all F's at the start of the instruction, it will contain all zeroes at the completion of the instruction.

30. INCUDF UDFname, EXT—Add the UDF specified in the instruction to the UDF Set specified in the preceding UDFSET instruction.

31. JUMP jump target—Unconditional jump. Add the displacement field to the current instruction counter.

32. JUMPL jump target—Unconditional long jump. Add the displacement field to the current instruction counter. Used for a long (+/−512 bytes) jump.

33. JAZ jump target—Jump if the A-Register 76 is equal to zero. If the A-Register 76 is equal to zero, add the displacement field to the current instruction counter. If not, execute the next sequential instruction.

34. JBZ jump target—Jump if the B-Register 78 is equal to zero. If the B-Register 78 is equal to zero, add the displacement field to the current instruction counter. If not, execute the next sequential instruction.

35. JANZ jump target—Jump if the A-Register 76 is not equal to zero. If the A-Register 76 is not equal to zero, add the displacement field to the current instruction counter. If not, execute the next sequential instruction.

36. JBNZ jump target—Jump if the B-Register 78 is not equal to zero. If the B-Register 78 is not equal to zero, add the displacement field to the current instruction counter. If not, execute the next sequential instruction.

37. JALTB jump target—Jump if the A-Register 76 is less than the B-Register 78. If the A-Register 76 is less than the B-Register 78, add the displacement field to the current instruction counter. If not, execute the next sequential instruction.

38. JALEB jump target—Jump if the A-Register 76 is less than or equal to the B-Register 78. If the A-Register 76 is less than or equal to the B-Register 78, add the displacement field to the current instruction counter. If not, execute the next sequential instruction.

39. JAEB jump target—Jump if the A-Register 76 is equal to the B-Register 78. If the A-Register 76 is equal to the B-Register 78, add the displacement field to the current instruction counter. If not, execute the next sequential instruction.

40. JAGEB jump target—Jump if the A-Register 76 is greater than or equal to the B-Register 78. If the A-Register 76 is greater than or equal to the B-Register 78, add the displacement field to the current instruction counter. If not, execute the next sequential instruction.

41. JAGB jump target—Jump if the A-Register 76 is greater than the B-Register 78. If the A-Register 76 is greater than the B-Register 78, add the displacement field to the current instruction counter. If not, execute the next sequential instruction.

42. JANEB jump target—Jump if the A-Register 76 is not equal to the B-Register 78. If the A-Register 76 is not equal to the B-Register 78, add the displacement field to the current instruction counter. If not, execute the next sequential instruction.

43. JINZ jump target—Jump if the I-Register 86 is not equal to zero. If the I-Register 86 is not equal to zero, add the displacement field to the current instruction counter. If not, execute the next sequential instruction.

44. JSAZ SA, jump target—Jump if the save area 74 specified in the instruction is equal to zero. If the specified save area 74 is equal to zero, add the displacement field to the current instruction counter. If not, execute the next sequential instruction.

45. JSANZ SA, jump target—Jump if the save area 74 specified in the instruction is not equal to zero. If the specified save area 74 is not equal to zero, add the displacement field to the current instruction counter. If not, execute the next sequential instruction.

46. LAR SA—Load the A-Register 76 from the I/O buffer 70. The rightmost three nibbles of the save area 74 specified in the instruction contain a displacement (DDD) into the I/O buffer 70 to byte 0 of an eight byte field. Load the number of bytes specified by the I-Register 86 from the I/O buffer 70 into the A-Register 76. The bytes are right justified into the A-Register 76. The A-Register 76 is cleared to all zeroes at the start of the instruction. If the I-Register 86 is zero at the start of the instruction, no bytes are moved. If the I-Register 86 is greater than eight at the start of the instruction, eight bytes are moved. If the I-Register 86 is less than eight at the start of the instruction, the bytes starting at byte 0 (leftmost) of the eight byte field are skipped over and the next 'I-Register' bytes are loaded right justified from the I/O buffer 70 into the A-Register 76.

47. LARI SA—Load the A-Register 76 from the I/O buffer 70. The rightmost three nibbles of the save area 74 specified in the instruction contain a first displacement (DDD) into the I/O buffer 70 to a second displacement (ddd). Use the second displacement (ddd) to locate byte 0 of an eight byte field. Load the number of bytes specified by the I-Register 86 from the I/O buffer 70 into the A-Register 76. The bytes are right justified into the A-Register 76. The A-Register 76 is cleared to all zeroes at the start of the instruction. If the I-Register 86 is zero at the start of the instruction, no bytes are moved. If the I-Register 86 is greater than eight at the start of the instruction, eight bytes are moved. If the I-Register is less than eight at the start of the instruction, the bytes starting at byte 0 (leftmost) of the eight byte field are skipped over and the next 'I-Register' bytes are loaded right justified from the I/O buffer 70 into the A-Register 76.

48. LDIRI ifield—Load the contents of the immediate field specified in the instruction into the I-Register 86.

49. LDKEY1 SA—Load the key from the save area 74 specified in the instruction into the K1-Register 80. 'SA' specifies an even numbered save area 74. Permissible values of 'SA' are 8, 10, 12, and 14 in the preferred embodiment. The even numbered save area 74 contains the quantity e*KM.CV1(K1). This quantity is the triple encipherment (ede) of K1 under the control vector variant (CV1) of key KM. The adjacent higher odd numbered save area 74 contains the quantity CV1. Successful completion of the instruction results in the clear key being loaded into the K1-Register 80.

50. LDKEY2 SA—Load the key from the save area 74 specified in the instruction into the K2-Register 82. 'SA' specifies an even numbered save area 74. Permissible values of 'SA' are 8, 10, 12, and 14 in the preferred embodiment. The even numbered save area 74 contains the quantity e*KM.CV1(K2). This quantity is the triple encipherment (ede) of K2 under the control vector variant (CV1) of key KM. The adjacent higher odd numbered save area 74 contains the quantity CV1. Successful completion of the instruction results in the clear key being loaded into the K2-Register 82.

51. MOVEAB—Move the contents of the A-Register 76 to the B-Register 78. The A-Register 76 is not changed.

52. MOVEIOB SAs, SAt—Move the number of bytes specified by the I-Register 86 from the I/O buffer source location specified in the source save area 74 to the I/O buffer target location specified in the target save area 74. The source and target displacements are the right justified two bytes of the respective save areas 74.

53. MULTSA SAi, SAj—Multiply the rightmost four bytes of the save areas 74 specified in the instruction together and store the eight byte result in the B-Register 78. The B-Register 78 is cleared to all zeroes at the start of the instruction. Unsigned integer arithmetic is used and any overflow is lost. The same save area 74 may be specified for both operands.

54. NOOP—No operation is performed. The UDF machine is not changed. This instruction is a place holder for debug and other uses.

55. NOTB—Complement the contents of the B-Register 78 and store the result in the B-Register 78.

56. ORR—OR the contents of the A-Register 76 to the contents of the B-Register 78 and store the result in the B-Register 78.

57. PADJB—Odd parity adjust the contents of the B-Register 78.

58. PADJK1—Odd parity adjust the contents of the K1-Register 80.

59. PADJK2—Odd parity adjust the contents of the K2-Register 82.

60. PADJSA SA—Odd parity adjust the contents of the save area 74 specified in the instruction.

61. POPA—Move the eight bytes of data found at the current TOS location to the A-Register 76. The initial contents of the A-Register 76 are lost. Increment the current TOS by eight.

62. POPB—Move the eight bytes of data found at the current TOS location to the B-Register 78. The initial contents of the B-Register 78 are lost. Increment the current TOS by eight.

63. POPI—Move the two bytes of data found at the current TOS location to the I-Register 86. The initial contents of the I-Register 86 are lost. A total of eight bytes are popped off the stack 72. The leftmost six bytes are discarded. Increment the current TOS by eight.

64. POPSA SA—Move the eight bytes of data found at the current TOS location to the save area 74 specified in the instruction. The initial contents of the specified save area 74 are lost. Increment the current TOS by eight.

65. PUSHA—Move the eight bytes of data found in the A-Register 76 to the current TOS location. The initial contents of the A-Register 76 are not changed. Decrement the current TOS by eight.

66. PUSHB—Move the eight bytes of data found in the B-Register 78 to the current TOS location. The initial contents of the B-Register 78 are not changed. Decrement the current TOS by eight.

67. PUSHI—Move the two bytes of data found in the I-Register 86 to the current TOS location. The initial contents of the I-Register 86 are not changed. Six bytes of zeroes are pushed on the left side. Decrement the current TOS by eight.

68. PUSHSA SA—Move the eight bytes of data found in the save area 74 specified in the instruction to the current TOS location. The initial contents of the specified save area 74 are not changed. Decrement the current TOS by eight.

69. RESTA SA—Move the eight bytes of data from the save area 74 specified in the instruction to the A-Register 76.

70. RESTB SA—Move the eight bytes of data from the save area 74 specified in the instruction to the B-Register 78.

71. RESTI SA—Move the rightmost two bytes of data from the save area 74 specified in the instruction to the I-Register 86.

72. RESTK1 SA—Move the eight bytes of data from the save area 74 specified in the instruction to the K1-Register 80.

73. RESTK2 SA—Move the eight bytes of data from the save area 74 specified in the instruction to the K2-Register 82.

74. REVLOBA—Interchange the two low order (rightmost) bytes in the A-Register 76. The other bytes in the A-Register 76 are not changed.

75. RUM—Replace under mask. Use the rightmost two bytes in the A-Register 76 as a bit mask for each of the nibbles in the B-Register 78. For each bit in the A-Register 76 that is equal to one, replace the corresponding nibble in the B-Register 7 with the leftmost nibble in the A-Register 76.

76. SAVEA SA—Move the eight bytes of data A-Register 76 to the save area 74 specified in the instruction.

77. SAVEB SA—Move the eight bytes of data from the B-Register 78 to the save area 74 specified in the instruction.

78. SAVEI SA—Move the two bytes of data from the I-Register 86 to the rightmost two bytes of the save area 74 specified in the instruction. The leftmost six bytes of the specified save area 74 are cleared to all zeroes.

79. SAVEK1 SA—Move the eight bytes of data from the K1-Register 80 to the save area 74 specified in the instruction.

80. SAVEK2 SA—Move the eight bytes of data from the K2-Register 82 to the save area 74 specified in the instruction.

81. SBR SA—Store the B-Register 78 to the I/O buffer 70. The rightmost three nibbles of the save area 74 specified in the instruction contain a displacement (DDD) into the I/O buffer 70 to byte 0 of an eight byte field. Store the number of bytes specified by the I-Register 86 from the B-Register 78 into the eight byte field in the I/O buffer 70. The bytes are right justified into the eight byte field in the I/O buffer 70. If the I-Register 86 is zero at the start of the instruction, no bytes are moved. If the I-Register 86 is greater than eight at the start of the instruction, eight bytes are moved. If the I-Register 86 is less than eight at the start of the instruction, the bytes starting at byte 0 (leftmost) of the eight byte field are skipped over and the next 'I-Register' bytes are stored right justified from the B-Register 78 into the eight byte field in the I/O buffer 70.

82. SBRI SA—Store the B-Register 78 to the I/O buffer 70. The rightmost three nibbles of the save area 74 specified in the instruction contain a first displacement (DDD) into the I/O buffer 70 to a second displacement (ddd). Use the second displacement (ddd) to locate byte 0 of an eight byte field. Store the number of bytes specified by the I-Register 86 from the B-Register 78 into the eight byte field in the I/O buffer 70. The bytes are right justified into the eight byte field in the I/O buffer 70. If the I-Register 86 is zero at the start of the instruction, no bytes are moved. If the I-Register 86 is greater than eight at the start of the instruction, eight bytes are moved. If the I-Register 86 is less than eight at the start of the instruction, the bytes starting at byte 0 (leftmost) of the eight byte field are skipped over and the next 'I-Register' bytes are stored right justified from the B-Register 78 into the eight byte field in the I/O buffer 70.

83. SETEND—Mark the end of a UDF Set definition.

84. SHIFTT +/−N—Shift the contents of the B-Register 78 right (+) or left (−) N positions as specified in the instruction. Zero bits are shifted in on the left or right and the bits shifted out on the right or left are lost. The maximum shift in either direction is 63.

85. STK2AREG offset—Move the eight bytes in the stack 72 starting at the offset specified in the instruction to the A-Register 76. The stack 72 and the TOS pointer are not changed. The specified offset is added to the 'origin of the stack'—the lowest address in stack storage. The low order three bits of the specified offset are set to X'000' to force the offset to be a multiple of eight bytes. The specified offset is relative to the origin of the stack 72, not the top of the stack 72. The origin of the stack 72 depends on the size of the stack 72. For a small stack 72, the origin of the stack 72 is at offset X'1000' from the start of the I/O buffer 70 and the instruction STK2AREG 8 would result in the eight bytes starting at X'1008' from the start of the I/O buffer 70 being stored in the A-Register 76. If the stack 72 is medium, the same instruction stores the eight bytes starting at X'E08' from the start of the I/O buffer 70 in the A-Register 76 and if the stack 72 is large, it stores the eight bytes starting at X'808' from the start of the I/O buffer 70 in the A-Register 76. It is the UDF programmer's responsibility to keep track of where data is moved to and from the stack 72.

86. SUBB—Subtract the contents of the A-Register 76 from the contents of the B-Register 78 and store the result in the B-Register 78. There are no facilities for detecting an underflow condition or the occurrence of a borrow value from the high order byte.

87. SWAP—Interchange the contents of the A-Register 76 and the contents of the B-Register 78.

88. UCALL local label—Provides a local CALL to be used within a UDF. This removes the need to have the called routine contain a UDF Header. This saves 32 bytes of storage space, but the specified local label is not callable by an external routine.

89. UDF UDFname—Invoke the UDF referenced by the UDF Reference ID field as a subroutine. UDFname can also be invoked by an external call.

90. UDFBEG UDFName, Ext, AuthLevel, MaxOut, <UserComment>—Start a UDF definition. Build the UDF Header. The length of the UDF Header is 32 bytes. The name of the UDF must be specified. The name can be up to eight characters long. Imbedded blanks are not allowed. If the name is less than eight characters long, it is padded on the right with blanks. The name must be the same name that is used in the INCUDF instruction. The name need not be the name of the object file that contains the UDF code. The name will be entered into the UDF Header and will be used for all references to the UDF. In addition to the UDFName field, there is a three character extension field. If the extension is less than three characters long, it is padded on the right with blanks. If an extension is specified, it must be the same extension that is used in the INCUDF instruction. The three byte extension field is concatenated to the right of the eight byte UDFName field to form an eleven byte internal name for the UDF. These eleven bytes are used to invoke the UDF. If the extension is omitted, the comma (,) must be supplied. The default extension is three blanks in the preferred embodiment. The authority level required to execute this UDF may also be specified. If the authority level is omitted, the comma (,) must be supplied. The default authority level is 0 in the preferred embodiment. The maximum authority level is 255 in the preferred embodiment. The maximum number of bytes that may be returned by the UDF may be specified as 'MaxOut.' 'MaxOut' may range from 0 to 4095 in the preferred embodiment. A 'MaxOut' value of 0 means that the UDF can return no output data. A 'MaxOut' value of 374 means that the maximum number of bytes that will be returned to the invoking application is 374. If the 'MaxOut' value is omitted, the default 'MaxOut' value is 256 in the preferred embodiment. The 'MaxOut' value has meaning for the UDF that receives control when execution begins. The number of bytes that are expected to be returned from the UDF is indicated when the UDF is invoked. This expected out value is compared to the 'MaxOut' value. If the 'MaxOut' value is less than the expected out value, execution does not start. The optional twelve byte user comment must be enclosed in pointy brackets as shown. This field is not checked in any way and may contain any imbedded characters with the exception of the pointy brackets used to delimit the field.

91. UDFEND—Mark the end of a UDF definition.

92. UDFSET UDFSetName, Ext, StackSize, <UserComment>—Start a UDF Set definition. Build the UDF Set Header. The length of the UDF Set header is 32 bytes. The name of the UDF Set must be specified. The name can be up to eight characters long. Imbedded blanks are not allowed. If the name is less than eight characters long, it is padded on the right with blanks. The name need not be the name of the file that contains the UDF Set code. The name will be entered into the UDF Set Header and will be used for all references to the UDF Set. In addition to the UDFSetName field, there is a three character extension field. If the extension is less than three characters long, it is padded on the right with blanks. The three byte extension field is concatenated to the right of the eight byte UDFSetName field to form an eleven byte internal name for the UDF Set. These eleven bytes are used for all references to the UDF Set. The UDFSetName and extension are used by the Register, Load, Verify, Delete, and Query commands. If the extension is omitted, the comma (,) must be supplied. The default extension is three blanks in the preferred embodiment. The stack size to be used with the UDF Set may also be specified. If the stack size is omitted, the comma (,) must be supplied. The default stack size is small (512 bytes) in the preferred embodiment. Other stack size choices are medium (1024 bytes) and large (2048 bytes). The first 512 bytes of stack space are located above the I/O buffer used for the UDFs. Stack space above 512 bytes is taken from the I/O buffer. The optional sixteen byte user comment must be enclosed in pointy brackets as shown. This field is not checked in any way and may contain any imbedded characters with the exception of the pointy brackets used to delimit the field.

93. URET—Provides a return from a local CALL to be used within a UDF. This removes the need to have the called routine specified by the UDF Header.

94. XNIB—Use each nibble in the B-Register 78 as an index into the A-Register 76. Replace each nibble in the B-Register 78 with the nibble in the A-Register 76 found at the indexed location.

95. XORR—XOR the contents of the A-Register 76 to the contents of the B-Register 78 and store the result in the B-Register 78.

96. XORK1 SA—XOR the contents of the save area 74 specified in the instruction to the contents of the K1-Register 80 and store the result in the K1-Register 80.

97. XORK2 SA—XOR the contents of the save area 74 specified in the instruction to the contents of the K2-Register 82 and store the result in the K2-Register 82.

While it is contemplated that a variety of op codes could be assigned to the UDF instructions, in the preferred embodiment, the op codes for ADDD, ANDD, EXIT, ORR, and SUBB are X'BB,' X'B9,' X'F0,' X'B8,' and X'BC,' respectively.

Preparing UDFs

The UDF development process is illustrated in FIG. 5. This process is described in detail in this section and in the next section on managing UDFs and external objects.

Using the set of UDF instructions, a UDF programmer can create a UDF in step 104. The first step is for the UDF programmer to decide what the UDF will be required to do, e.g., a proprietary personal identification number (PIN) verification algorithm, alteration of a cryptographic key prior to use, special functions to accommodate the intersection of dissimilar cryptographic regions. The next step is for the UDF programmer to select particular instructions from the set of UDF instructions and arrange them in a sequence appropriate to implement the desired function of the UDF. This second step is very much like writing any other program. The length of the data input to the UDF and the length of the result output from the UDF are limited to 4095 bytes in the preferred embodiment, but can be expanded by known methods.

A UDF can be created using any editor 106 the UDF programmer chooses. The UDF input file 108 that is created is assembled. In the preferred embodiment, the UDF input file 108 is assembled using a macroassembler 110, such as the IBM Macro Assembler/2 ™ or the MicroSoft Macro Assembler, along with an include file of macros 112. The macro include file 112 contains the code required to translate the UDF instructions into the coded bytes understandable by the interpreter microcode that implements the UDF machine. The assembler 110 accepts the mnemonic form of the UDF instructions as a text input file. In general, an entire UDF is contained in a single text file. The UDF input file 108 is checked for validity and the UDF instructions are assembled into a UDF object file 114. Each of the individual UDFs is assembled in this way. The format of an individual UDF after it has been assembled is described in Chart 1, below.

Chart 1

Format of an individual UDF

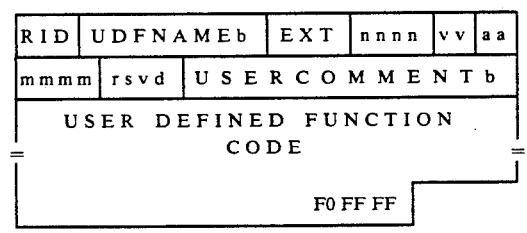

RID = Reference ID - This number is assigned by the linker when the UDF Set is built. It is used to invoke the UDF when it is called as a subroutine from another UDF.

UDFNAME = Alphanumeric name of the UDF. The name may have a maximum of eight characters. If the name is less than eight characters, it is padded with blanks. This name is used when the UDF is invoked.

EXT = Three character extension to the UDFNAME. If the extension is less than three characters, it is padded with blanks. This extension is used when the UDF is invoked.

nnnn = Total number of bytes in the UDF.

vv = Version number of the UDF Macro Include File used to assemble the UDF.

aa = Authority level required to execute the UDF. The user's authority level must be greater than or equal to this authority level.

mmmm = Total number of bytes permitted to be output by the UDF. This number is enforced when the UDF execution ends.

USERCOMMENT = Twelve character field for any user information. If the usercomment is less than twelve characters, it is padded with blanks. The usercomment is not checked in any way.

Most of these fields are set by the UDFBEG instruction.

A UDF Set is created in much the same way as an individual UDF. Using the INCUDF instruction, the UDF programmer specifies the UDFs to be included in the UDF Set. The first object file must have the UDFSET instruction in it. The remainder of the object files, which contain the individual UDFs, can be specified in any sequence. The UDF Set definition file that is created is then assembled and linked together with the previously assembled individual UDFs into a single UDF Set. The UDF Set cannot exceed 4096 bytes in length in the preferred embodiment, but can be expanded by known methods. A linker 116, such as the IBM Macro Assembler/2 Linker, is used to link the UDF Set 118. The linker 116 collects the individual UDFs into the UDF Set 118. The format of a UDF Set after it has been assembled and linked is described in Chart 2, below.

Chart 2
Format of a UDF Set

| NN | SETNAMEb | EXT | nnnn | vv | ss |
|----|----------|-----|------|----|----|
| USERCOMMENTbbbbb ||||||
| IA01 | IA02 | IA03 | IA04 | IA05 | IA06 | IA07 |
| IA08 | IA09 | | ... | | IAL | |
| USER DEFINED FUNCTION 01 CODE ... F0 FF FF ||||||
| USER DEFINED FUNCTION 02 CODE ... FF FF ||||||
| USER DEFINED FUNCTION Last CODE ... FF FF ||||||

NN = Number of UDFs in the UDF Set.

SETNAME = Alphanumeric name of the UDF Set. The name may have a maximum of eight characters. If the name is less than eight characters, it is padded with blanks.

EXT = Three character extension to the SETNAME. If the extension is less than three characters, it is padded with blanks.

nnnn = Total number of bytes in the UDF Set.

vv = Version number of the UDF Macro Include File used to assemble and link the UDF Set.

ss = Stack size: 0 = small, 1 = medium, 2 = large

USERCOMMENT = Sixteen character field for any user information. If the usercomment is less than sixteen characters, it is padded with blanks. The usercomment is not checked in any way.

IAx = Initial address for UDF x

Most of these fields are set by the UDFSET instruction. A utility program 120 removes the EXE header (the first 512 bytes) from the UDF Set 118 produced by the assembler 110 and the linker 116. The result is an executable UDF Set 122.

The executable UDF Set 122 may be used as input to a UDF simulator 124 to verify the operation of the individual UDFs. The UDF simulator 124 accepts the output of the UDF linker step and allows the UDF programmer to simulate the execution of the UDF and trace the results generated at each step. Thus, the UDF simulator 124 provides a means to assist the UDF programmer in debugging the UDF. It is well known to one of ordinary skill in the art to provide a simulator having the software to verify the operation of a UDF and assist in the debugging of a UDF. The UDF simulator screen displays the disassembled UDF, the registers, the save areas, etc. of FIG. 4. Each time 'Enter' is pressed, the current instruction is executed and the display screen is updated. There are several options to choose with the UDF simulator display screen. One option toggles the display screen between the save area 74 and the stack 72. Another option ('Update') allows the UDF programmer to modify the data on the display screen. The save areas 74, the registers, and the I/O buffer 70 can be changed in this way. 'Update' can be entered anytime the UDF simulator is waiting for input while doing UDF simulation. A third option ('Go') causes the current UDF to run to the next 'EXIT' instruction or until CTRL-BREAK is pressed. When the end is reached, the UDF programmer is taken to a display screen that permits the programmer to specify a file name into which the current I/O buffer 70 can be saved for future use. The UDF programmer could also use this method to get the first I/O buffer 70 image to be loaded. This display screen appears only at the completion of a UDF.

When a UDF is invoked, up to 4095 bytes of data can be passed into the UDF from the invoking application. The number of bytes that are actually passed in is specified at the time the UDF is invoked. When the UDF receives control, the I/O buffer 70 contains the data to be passed into the UDF. All data to be processed by the UDF machine has to be moved from the I/O buffer 70 to the A-Register 76. There are two instructions to move data from the I/O buffer 70 to the A-Register, LAR and LARI. If the input data is always at fixed locations in the I/O buffer 70, the UDF programmer can use the LAR instruction to move the data from the location in the I/O buffer 70 specified by the contents of the save area 74 to the A-Register 76. The DEFCON instruction can be used to setup the save area 74 with the location of the input data in the I/O buffer 70. If the input data can be at different locations in the I/O buffer 70, the UDF programmer can use the LARI instruction to move the data from an indirect location in the I/O buffer 70 to the A-Register 76.

When a UDF has completed executing, up to 4095 bytes of data can be returned from the UDF to the invoking application. The number of bytes that are actually returned is specified at the time the UDF is invoked. When the UDF relinquishes control, the contents of the I/O buffer 70 are returned to the invoking application. Thus, the UDF programmer must ensure that the data to be returned is in the I/O buffer 70 prior to exiting the UDF. There are two instructions to move data from the B-Register 78 to the I/O buffer 70, SBR and SBRI. If the output data is always at fixed locations in the I/O buffer 70, the UDF programmer can use the SBR instruction to move the data from the B-Register 78 to the location in the I/O buffer 70 specified by the contents of the save area 74. The DEFCON instruction can be used to setup the save area 74 with the desired location of the output data in the I/O buffer 70. If the output data can be at different locations in the I/O buffer 70, the UDF programmer can use the SBRI instruction to move data from the B-Register 78 to an indirect location in the I/O buffer 70.

Cryptographic keys can also be used in a UDF. Cryptographic keys can either be generated for use in the UDF or operational forms of the keys can be used to complete the processing. The LDKEY1 and LDKEY2 instructions can be used to recover clear keys into the K1-Register 80 and the K2-Register 82, respectively. Generated keys can be put into operational form by using the EMKK1 and EMKK2 instructions. There are four instructions available for cryptographic processing in the UDF, ENCIP, DECIP, ENCODE, and DECODE. These four instructions provide all the cryptographic processing required to perform any DES operations that may be desired on the data being processed by the UDF.

Managing UDFs and External Objects

The set of UDF commands includes six commands for use in managing UDFs. These commands are REGISTER, LOAD, VERIFY, DELETE, INVOKE, and QUERY. It is contemplated, however, that additional UDF commands may be implemented. Four of these commands, REGISTER, VERIFY, DELETE, and QUERY can also be used to manage external objects. An external object can be any collection of data. All of these commands may be authorized in the same way any other command may be authorized. This mechanism provides some control over the individuals who may register, load, verify, delete, invoke, and query UDFs. Each of these commands is described and discussed in greater detail below.

The REGISTER OBJECT command is used to provide a means of registering objects at some point in time for the purpose of authenticating them at some future point in time. The object being registered is passed into the secure area of the cryptographic module 10' and a Modification Detection Code (MDC) is calculated for the object. The MDC is then stored along with the object name and other information in an internal object table in non-volatile lower chip 18. The registration process does not result in the object being loaded, but rather in the MDC being calculated and stored along with some other information. There are several options to choose with the REGISTER OBJECT command. The first option determines how to deal with duplicate entries. 'NOREPL' specifies that the object is to be registered only if there is no duplicate entry in the table. 'UNCOND' specifies that the object is to be unconditionally registered. If there is a duplicate entry in the table, it is overlaid by the parameters of the current object. The second option determines in what form the UDF Set will be sent. 'CIPHERED' specifies that the UDF Set is being sent in ciphertext. The user must also specify the key, the ICV, and the last block rules. 'CLEAR' specifies that the UDF Set is being sent in cleartext. If neither 'CIPHERED' nor 'CLEAR' is specified, the UDF Set is assumed to be in cleartext. The maximum number of objects that can be registered at one point in time is 128 in the preferred embodiment.

The LOAD OBJECT command is used to provide a means of loading objects (code) at some point in time for the purpose of using them at some future point in time. The object being loaded is read into the secure area of the cryptographic module 10' and an MDC is calculated for the object. This MDC is then compared to the stored MDC. If the calculated MDC matches the stored MDC, the object is loaded. If the object is a UDF Set, it is loaded and made the active set. Only one UDF Set can be loaded into the non-volatile lower chip 18 at one point in time. An option with the LOAD OBJECT command determines in what form the UDF Set will be sent. 'CIPHERED' specifies that the UDF Set is being sent in ciphertext. The user must also specify the key, the ICV, and the last block rules. 'CLEAR' specifies that the UDF Set is being sent in cleartext. If neither 'CIPHERED' nor 'CLEAR' is specified, the UDF Set is assumed to be in cleartext.

The VERIFY OBJECT command is used to provide a means of verifying objects at some point in time that have been previously registered. The object being verified is read into the secure area of the cryptographic module 10' and an MDC is calculated for the object. This MDC is then compared to the stored MDC. If the calculated MDC matches the stored MDC, the object has been verified and a successful return code is sent. If the object fails to verify, an unsuccessful return code is sent. An object that has been registered or loaded is not altered by the VERIFY OBJECT command. An option with the VERIFY OBJECT command determines in what form the UDF Set will be sent. 'CIPHERED' specifies that the UDF Set is being sent in ciphertext. The user must also specify the key, the ICV, and the last block rules. 'CLEAR' specifies that the UDF Set is being sent in cleartext. If neither 'CIPHERED' nor 'CLEAR' is specified, the UDF Set is assumed to be in cleartext.

The DELETE OBJECT command is used to provide a means of deleting objects (code) at some point in time that have been previously registered by the REGISTER OBJECT command. An option with the DELETE OBJECT command determines what is to be deleted. 'CODEONLY' specifies that only the object is to be erased. The object remains registered. 'ENTRY' specifies that the object is to be erased and the entry in the internal object table is to be removed.

The INVOKE CODE command is used to provide a means of executing code at some point in time that has been previously registered using the REGISTER OBJECT command and loaded using the LOAD OBJECT command.

The QUERY OBJECT command is used to provide a means of querying objects at some point in time. An option with the QUERY OBJECT command determines what information is to be returned by the command. 'EXIST' determines if the object exists in the internal object table. Only a return code is returned. 'TERSE' determines if the object exists in the internal object table and if it does, the short form of information concerning the object is returned. 'VERBOSE' determines if the object exists in the internal object table and if it does, the full form of information concerning the object is returned.

Example of a UDF

Figure 6:
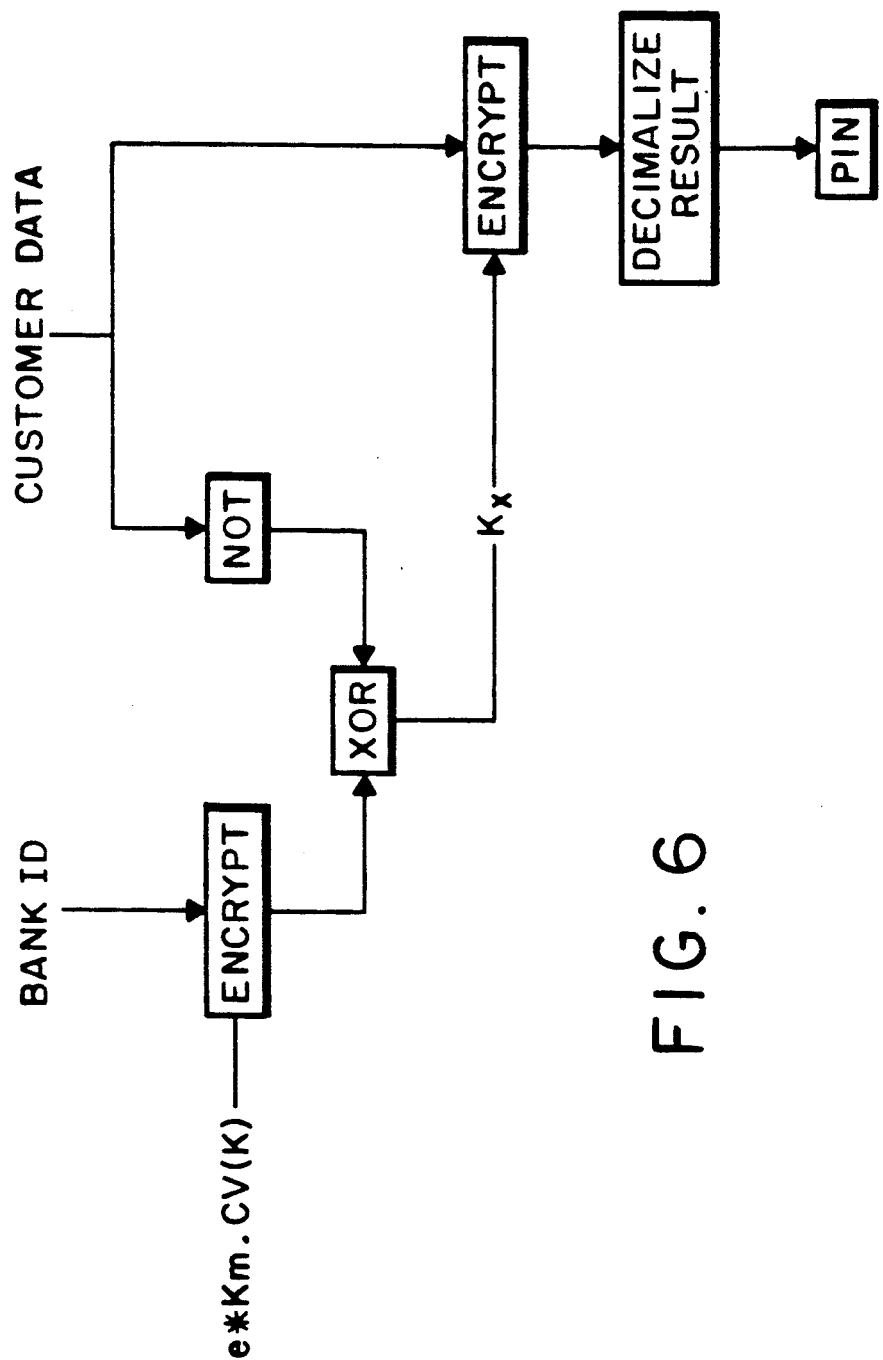
FIG. 6 is a flow chart illustrating a PIN derivation algorithm.

One particular Personal Identification Number (PIN) derivation algorithm requires the ID of the bank and some data related to the customer to derive the PIN. The bank ID is encrypted using a cryptographic key. The result of this encryption is exclusive-OR'd with the complement of the customer data to form a new cryptographic key (Kx). The customer data is then encrypted using Kx. The encrypted customer data is converted to decimal digits by translating 0-9 to 0-9 and A-F to 0-5, respectively. The final result is the derived PIN. FIG. 6 shows a flowchart of the PIN derivation algorithm.

The input data required to perform the PIN derivation algorithm is assembled by the invoking application and passed into the UDF. The data is passed when the UDF is invoked. The resulting PIN is returned from the UDF to the invoking application. The PIN is returned when the UDF has completed executing. The contents of the I/O buffer when the UDF receives and relinquishes control is shown in Chart 3, below.

Chart 3

| Contents of the I/O Buffer | |
|---|---|
| | 0        7 |
| 000 | PIN |
| 008 | Bank ID |
| 010 | Customer Data |
| 018 | e*Km.CV(Key) |

The UDF implementation of the PIN derivation algorithm is shown in Chart 4, below.

Chart 4

| | | UDF Implementation of the PIN Derivation Algorithm | |
|---|---|---|---|
| 1 | UDFBEG | SPEC_PIN,ABC,120,8<Special PIN UDF> | |
| | | | ; Get key |
| 2 | DEFCON | 2,18 | ; Displacement to encrypted key |
| 3 | LDIRI | 8 | ; Number of bytes to be loaded |
| 4 | LAR | 2 | ; A-Reg = encrypted key |
| 5 | SAVEA | 8 | ; SA 8 = encrypted key |
| 6 | DEFCON | 9,00 22 7E 00 03 41 00 00 | |
| | | | ; Define control vector |
| 7 | LDKEY1 | 8 | ; K1-Reg = clear key |
| | | | ; Get customer data |
| 8 | DEFCON | 7,10 | ; Displacement to customer data |
| 9 | LDIRI | 8 | ; Number of bytes to be loaded |
| 10 | LAR | 7 | ; A-Reg = customer data |
| 11 | MOVEAB | | ; B-Reg = customer data |
| 12 | NOTB | | ; B-Reg = inverse of customer data |
| 13 | PUSHA | | ; Stack = customer data |
| | | | ; Get bank ID |
| 14 | DEFCON | 5,8 | ; Displacement to bank ID |
| 15 | LDIRI | 8 | ; Number of bytes to be loaded |
| 16 | LAR | 5 | ; A-Reg = bank ID |
| 17 | ENCODE | K1,A,A | ; A-Reg = encrypted bank ID |
| | | ; | = eK(bank ID) |
| 18 | XORR | | ; B-Reg = Kx = eK(bank ID) xor |
| | | | ; (inverse of customer data) |
| 19 | POPA | | ; A-Reg = customer data |
| 20 | SAVEB | 12 | ; SA 12 = Kx |
| 21 | RESTK2 | 12 | ; K2-Reg = Kx |
| 22 | ENCODE | K2,A,B | ; B-Reg = encrypted customer data |
| | | ; | = eKx(customer data) |
| 23 | DEFCON | 14,01 23 45 67 89 01 23 45 | |
| | | | ; Define decimalization table |
| 24 | RESTA | 14 | ; A-Reg = decimalization table |
| 25 | XNIB | | ; Decimalize encrypted customer data |
| 26 | DEFCON | 4,0 | ; Displacement to PIN |
| 27 | LDIRI | 8 | ; Number of bytes to be loaded |
| 28 | SBR | 4 | ; Store PIN in I/O buffer |
| 29 | EXIT | | ; UDF complete |
| 30 | UDFEND | | |

The UDF is assembled using a macroassembler and then linked with other UDFs to form a UDF set. The UDF Set is registered and loaded and the UDF is invoked.

The numbers in the leftmost column of Chart 4 are used as a reference in the following description of the operation of the steps in the UDF.

Step 1 defines the name of the UDF and other parameters. To invoke the UDF, the name 'SPEC_PIN-.ABC' is used. The authority level required to invoke the UDF if 120 and a maximum of eight bytes may be returned from the UDF to the invoking application.

Step 2 defines the constant 18 into save area 2. The value 18 is in hexadecimal and represents the displacement into the I/O buffer to the encrypted key. The key was encrypted using the control vector and the master key.

Step 3 loads the number 8 into the I-Register for use by the LAR instruction.

Step 4 loads the A-Register from the I/O buffer using save area 2. Save area 2 contains the value X'18' from step 2. The eight bytes located at offset 18 in the I/O buffer are loaded into the A-Register. The A-Register now contains the encrypted key.

Step 5 saves the contents of the A-Register in save area 8 for use by the LDKEY1 instruction.

Step 6 defines the control vector into save area 9 for use by the LDKEY1 instruction.

Step 7 loads the clear key into the K1-Register. The encrypted key in save area 8 is combined with the control vector in save area 9 to recover the clear key.

Step 8 defines the constant 10 into save area 7. The value 10 is in hexadecimal and represents the displacement into the I/O buffer to the customer data.

Step 9 loads the number 8 into the I-Register for use by the LAR instruction.

Step 10 loads the A-Register from the I/O buffer using save area 7. Save area 7 contains the value X'10' from step 8. The eight bytes located at offset 10 in the I/O buffer are loaded into the A-Register. The A-Register now contains the customer data.

Step 11 moves the contents of the A-Register to the B-Register. The A-Register is not changed. The B-Register now contains the customer data. The copy of the customer data in the B-Register will be inserted and exclusive-OR'd with the encrypted bank ID.

Step 12 complements the copy of the customer data in the B-Register. All of the bits in the B-Register are inverted.

Step 13 pushed the un-inverted value of the customer data in the A-Register onto the stack for later use.

Step 14 defines the constant 8 into save area 5. The value 8 is in hexadecimal and represents the displacement into the I/O buffer to the bank ID.

Step 15 loads the number 8 into the I-Register for use by the LAR instruction.

Step 16 loads the A-Register from the I/O buffer using save area 5. Save area 5 contains the value X'8' from step 14. The eight bytes located at offset 8 in the I/O buffer are loaded into the A-Register. The A-Register now contains the bank ID.

Step 17 encrypts the contents of the A-Register using the Key in the K1-Register and stores the result in the A-Register. The A-Register now contains the encrypted bank ID.

Step 18 exclusive-OR's the encrypted bank ID contained in the A-Register to the inverse of the customer data contained in the B-Register. The result is store din the B-Register. The result is the Key Kx which will be used for further processing.

Step 19 pops the un-inverted value of the customer data from the stack to the A-Register.

Step 20 saves the key Kx in save area 12 for use by the RESTK2 instruction.

Step 21 moves the Key Kx from save area 12 into the K2-Register for use by the ENCODE instruction.

Step 22 encrypts the contents of the A-Register using the key (Kx) in the K2-Register and stores the result in the B-Register. The B-Register now contains the encrypted customer data.

Step 23 defines the decimalization table into save area 14. This is the table that will be used to convert the result of the previous encryption step from values of 0–F to values of 0–9 for use as a PIN.

Step 24 moves the decimalization table from save area 14 into the A-Register for use by the XNIB instruction.

Step 25 performs the decimalization of the hexadecimal form of the encrypted customer data in the B-Register. Each nibble in the B-Register is used as an index into the A-Register. The value contained at the indexed location in the A-Register replaces the index value in the B-Register.

Step 26 defines the constant 0 into save area 4. The value 0 is in hexadecimal and represents the displacement into the I/O buffer to the PIN. The PIN will be returned to the invoking application.

Step 27 loads the number 8 into the I-Register for use by the SBR instruction.

Step 28 stores the B-Register to the I/O buffer using save area 4. Save area 4 contains the value X'0' from step 26. The eight bytes in the B-Register are moved to offset 0 in the O/O buffer. The location at offset 0 in the I/O buffer now contains the PIN.

Step 29 exits the UDF. The required operations have been executed and the PIN is ready to be returned to the invoking application.

Step 30 marks the end of the UDF for the macroassembler.

While the preferred embodiment of the present invention has been shown and described in detail, it should be apparent to those of ordinary skill in the art that various adaptations and modifications may be made without departing form the scope of the invention. The present invention is intended to cover all such adaptations and modifications that fall within the scope of the present invention as defined in the appended claims.

What is claimed is:

1. A cryptographic module for storing and operating on user defined cryptographic functions, said cryptographic module providing a physically and electrically secure environment, said user defined cryptographic functions including instructions arranged in a particular sequence to implement a desired cryptographic function, said cryptographic module comprising:

memory for storing said user defined cryptographic functions, said memory including:
      code for translating said user defined cryptographic functions into a machine-executable form, and
      code implementing at least one command for operating on said machine-executable form of said user defined cryptographic functions;
   a processing unit connected to said memory for executing said code for translating said user defined cryptographic functions into a machine-executable form and for executing said code implementing at least one command for operating on said machine-executable form of said user defined cryptographic functions;
   a physical protection device for protecting said cryptographic module from physical attack; and
   an electrical protection device for protecting said cryptographic module from electrical attack.

2. The cryptographic module of claim 1 wherein said code for translating said user defined cryptographic functions into a machine-executable form includes an interpreter program.

3. The cryptographic module of claim 1 wherein said memory includes erasable programmable read only memory and random access memory.

4. The cryptographic module of claim 3 wherein said code for translating said user defined cryptographic functions into a machine-executable form is stored in said erasable programmable read only memory.

5. The cryptographic module of claim 4 wherein said code for translating said user defined cryptographic functions into a machine-executable form includes an interpreter program.

6. The cryptographic module of claim 3 wherein there is at least one executable cryptographic function stored in said erasable programmable read only memory.

7. The cryptographic module of claim 3 wherein there is at least one executable user defined cryptographic function stored in said random access memory.

8. The cryptographic module of claim 3 wherein said random access memory is non-volatile.

9. The cryptographic module of claim 1 wherein there is at least one executable cryptographic function stored in said memory.

10. The cryptographic module of claim 1 wherein there is at least one executable user defined cryptographic function stored in said memory.

11. The cryptographic module of claim 1 wherein said at least one command for operating on said machine-executable form of said user defined cryptographic functions is selected from the group of commands consisting of:
   registering said user defined cryptographic functions in said memory,
   loading said user defined cryptographic functions into said memory,
   verifying that said user defined cryptographic functions have not been altered since they were registered in said memory,
   deleting said user defined cryptographic functions form said memory,
   invoking said user defined cryptographic functions, and
   querying whether said user defined cryptographic functions have been registered in said memory.

12. The cryptographic module of claim 1 wherein said memory further includes code implementing a command for registering external objects in said memory.

13. The cryptographic module of claim 12 wherein said memory further includes code implementing a command for verifying that said external objects have not been altered since they were registered in said memory.

14. The cryptographic module of claim 12 wherein said memory further includes code implementing a command for deleting said external objects from said memory.

15. The cryptographic module of claim 12 wherein said memory further includes code implementing a command for querying whether said external objects have been registered in said memory.

16. The cryptographic module of claim 1 wherein said processing unit includes a cipher processor and a microprocessor.

17. The cryptographic module of claim 1 wherein there is memory contained outside of said physically and electrically secure environment connected to said processing unit.

18. The cryptographic module of claim 17 wherein said memory is random access memory.

19. The cryptographic module of claim 1 wherein said physical protection device includes an intrusion barrier for protecting against mechanical intrusion, chemical intrusion, temperature modification, and radiation exposure.

20. The cryptographic module of claim 1 wherein said electrical protection device includes electrical circuitry that prevents access to said memory while said processing unit is performing a read from said memory and that prevents access to said memory while said processing unit is executing an instruction which was not fetched from said memory.

21. The cryptographic module of claim 1 wherein there is a master key which is used by said user defined cryptographic functions to recover keys encrypted under said master key and wherein said master key is not available to said user defined cryptographic functions.

22. The cryptographic module of claim 1 wherein there is a cryptographic key which is utilized by said user defined cryptographic functions if a bit in a control vector associated with said cryptographic key is active and which is prevented from being utilized by said user defined cryptographic functions if said bit in said control vector associated with said cryptographic key is not active.

23. The cryptographic module of claim 1 wherein there are cryptographic keys and a control vector, said control vector including bits for use in separating cryptographic keys which are used in said user defined cryptographic functions and cryptographic keys which are used for other purposes.

24. A method of storing and operating on user defined cryptographic functions in a cryptographic module, the cryptographic module providing a physically and electrically secure environment, the user defined cryptographic functions including instructions arranged in a particular sequence to implement a desired cryptographic function, said method comprising the steps of:
storing the user defined cryptographic functions in memory in the cryptographic module;
translating the user defined cryptographic functions into a machine-executable form;
operating on the machine-executable form of the user defined cryptographic functions in the cryptographic module;
protecting the cryptographic module from physical attack; and
protecting the cryptographic module from electrical attack.

25. The method of claim 24 wherein said step of translating the user defined cryptographic functions into a machine-executable form includes the step of interpreting the user defined cryptographic functions.

26. The method of claim 24 wherein said memory includes erasable programmable read only memory and random access memory.

27. The method of claim 26 further comprising the step of storing at least one executable cryptographic function in said erasable programmable read only memory.

28. The method of claim 26 further comprising the step of storing at least one executable user defined cryptographic function in said random access memory.

29. The method of claim 26 wherein said random access memory is non-volatile.

30. The method of claim 24 further comprising the step of storing at least one executable cryptographic function in said memory.

31. The method of claim 24 further comprising the step of storing at least one executable user defined cryptographic function in said memory.

32. The method of claim 31 wherein said step of operating on the machine-executable form of the user defined cryptographic functions in the cryptographic module includes the step of executing code implementing at least one command for operating on the machine-executable form of the user defined cryptographic functions, wherein the at least one command is selected from the group of commands consisting of:
registering said user defined cryptographic functions in said memory,
loading said user defined cryptographic functions into said memory,
verifying that said user defined cryptographic functions have not been altered since they were registered in said memory,
deleting said user defined cryptographic functions from said memory,
invoking said user defined cryptographic functions, and
querying whether said user defined cryptographic functions have been registered in said memory.

33. The method of claim 24 wherein said step of operating on the machine-executable form of the user defined cryptographic functions in the cryptographic module includes the step of executing code implementing at least one command for operating on the machine-executable form of the user defined cryptographic functions, wherein the at least one command is selected from the group of commands consisting of:
registering said user defined cryptographic functions in said memory,
loading said user defined cryptographic functions into said memory,
verifying that said user defined cryptographic functions have not been altered since they were registered in said memory,
deleting said user defined cryptographic functions from said memory,
invoking said user defined cryptographic functions, and
querying whether said user defined cryptographic functions have been registered in said memory.

34. The method of claim 24 further comprising the step of executing code implementing a command for registering external objects in said memory.

35. The method of claim 34 further comprising the step of executing code implementing a command for versifying that said external objects have not been altered since they were registered in said memory.

36. The method of claim 34 further comprising the step of executing code implementing a command for deleting said external objects from said memory.

37. The method of claim 34 further comprising the step of executing code implementing a command for querying whether said external objects have been registered in said memory.

38. The method of claim 24 wherein said step of projecting the cryptographic module from physical attack includes the step of protecting the cryptographic module against mechanical intrusion, chemical intrusion, temperature modification, and radiation exposure.

39. The method of claim 24 wherein said step of protecting the cryptographic module from electrical attack includes the step of preventing access to said memory while a read is being performed from said memory and preventing access to said memory while an instruction which was not fetched from said memory is being executed.

40. The method of claim 24 further comprising the step of separating cryptographic keys which are used in said user defined cryptographic functions and cryptographic keys which are used for other purposes.

41. A cryptographic unit having electrical circuitry for storing and operating on user defined cryptographic functions, said cryptographic unit providing a physically and electrically secure environment, said user defined cryptographic functions including instructions arranged in a particular sequence to implement a desired cryptographic function, said cryptographic unit comprising:
  memory for storing said user defined cryptographic functions, said memory including:
    code for translating said user defined cryptographic functions into a machine-executable form, and
    code implementing at least one command for operating on said machine-executable form of said user defined cryptographic functions;
  a processing unit connected to said memory for executing said code for translating said user defined cryptographic functions into a machine-executable form and for executing said code implementing at least one command for operating on said machine-executable form of said user defined cryptographic functions;
  a physical protection device for protecting said cryptographic module form physical attack; and
  an electrical protection device for protecting said cryptographic module from electrical attack.

42. The cryptographic unit of claim 41 wherein said memory includes erasable programmable read only memory and random access memory.

43. The cryptographic unit of claim 41 wherein said processing unit includes a cipher processor and a microprocessor.

* * * * *

UNITED STATES PATENT AND TRADEMARK OFFICE
CERTIFICATE OF CORRECTION

PATENT NO. : 5,301,231
DATED : April 5, 1994
INVENTOR(S) : Abraham, et al.

It is certified that error appears in the above-identified patent and that said Letters Patent is hereby corrected as shown below:

Col. 26, line 48 -- "form" should be changed to --from--

Col. 30, line 19 -- "form" should be changed to --from--

Signed and Sealed this

Ninth Day of August, 1994

Attest:

BRUCE LEHMAN

Attesting Officer

Commissioner of Patents and Trademarks